United States Patent

Garrett

[15] 3,643,507
[45] Feb. 22, 1972

[54] MEANS FOR DETERMINING FLOW RATE AND VOLUME OF A FLOWING FLUID MASS

[72] Inventor: Sheyrl W. Garrett, Tulsa, Okla.
[73] Assignee: Combustion Engineering, Inc., New York, N.Y.
[22] Filed: Nov. 12, 1970
[21] Appl. No.: 88,806

[52] U.S. Cl. ........................................73/194 R, 73/61.1 R
[51] Int. Cl. ...............................................................G01f 1/00
[58] Field of Search ............73/194 R, 194 E, 194 M, 231 M, 73/61.1 R

[56] References Cited

UNITED STATES PATENTS

| | | | |
|---|---|---|---|
| 3,385,108 | 5/1968 | Rosso | 73/194 R |
| 3,425,274 | 2/1969 | Clement et al. | 73/194 R |
| 3,537,312 | 11/1970 | Moore | 73/194 R X |
| 3,566,685 | 3/1971 | Zimmerman et al. | 73/194 R |

Primary Examiner—Charles A. Ruehl
Attorney—Arthur L. Wade

[57] ABSTRACT

A system which includes a flow meter producing voltage pulses of a frequency proportional to the flow rate of a flowing mass, and a sensing element responsive to a physical condition of the flowing mass with a circuit which produces a DC voltage signal analogous to that condition. A generator provides linear sawtooth voltage pulses against which a comparator circuit compares the analog voltage from the sensing element and circuit. The voltage resultant of the comparison switches a portion of the voltage pulses from the flow meter to a divider circuit element and a subtractor circuit element of the system for conversion of relatively low order changes in the physical condition to their full range equivalents, and for correction of the flow rate or volume as a function of such changes. The flow rate or volume as thus corrected is registered on a suitable flow rate indicator or volume counter.

4 Claims, 1 Drawing Figure

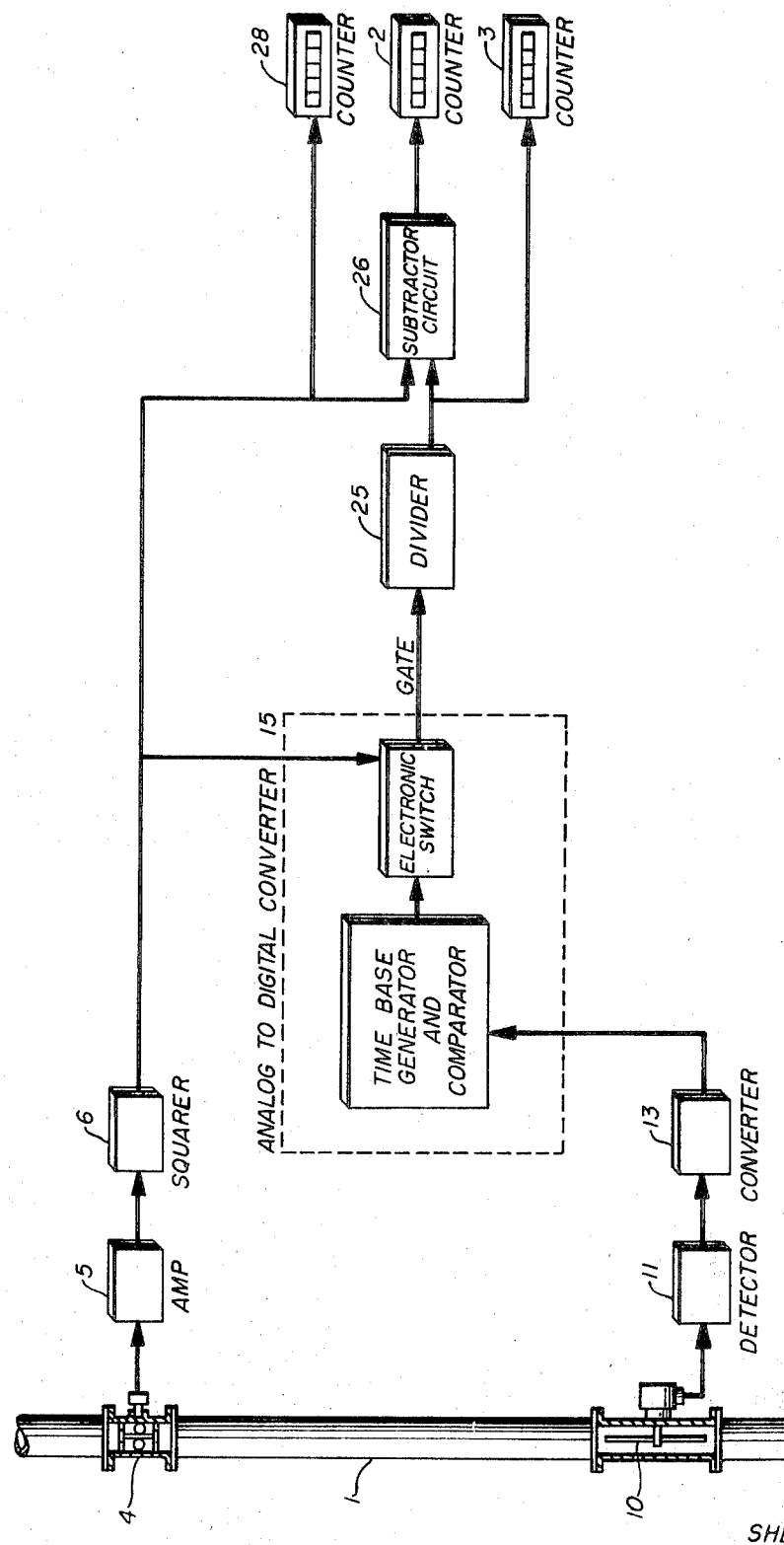

MEANS FOR DETERMINING FLOW RATE AND VOLUME OF A FLOWING FLUID MASS

BACKGROUND OF THE INVENTION

1. Field of the Invention

This invention relates to electronic measurement of a physical condition to accomplish corrections that are required in flow rate of flow quantity measurements as a result of changes in a physical condition of the flowing fluids. More particularly, the invention relates to the switching, or gating, of voltage pulses generated by a flow meter by means of an analog voltage signal proportional over the signal's full range to only a small portion of the condition's possible full range; the pulses so gated are applied at a divider circuit to convert the pulses to a full range equivalent, and the pulses gated and divided are subtracted from the total pulses to correct the measurement of flow rate or quantity before registration on a flow rate indicator or flow volume counter.

2. Description of the Prior Art

It is known to make flow rate and quantity measurements, as well as measurements of various physical properties of materials, by sensing elements in contact with the materials. It is also known to measure flow rate and/or quantity of flowing fluids by producing voltage pulses of a frequency proportional thereto, and it is known to convert the sensing of physical properties of the flowing mass, such as temperature, pressure, and ratio of fluids in a fluid mixture, to analog DC voltages.

Furthermore, it is known from the disclosure of U.S. Pat. No. 3,385,108 to switch, or gate, a quantity of the voltage pulses which are proportional to flow in response to the level of the analog which is proportional to flow in response to a physical condition of the flowing mass by means of a three component converter device comprised of a fixed-time-base linear sawtooth voltage generator, a comparator circuit which compares the analog to the sawtooth and produces a voltage dependent upon such comparison, and a switch means responsive to the comparator voltage output which resulted from the comparison. The switch means in response to the comparator output then gates some portion of the voltage pulses to means which manifest certain conditions of the flowing mass such as flow rates and/or volumes of the mass or its constituents.

It has long been a problem, however, to obtain an accurate measurement of these physical characteristics when the actual change on the physical characteristics is of a low order relative to its total possible change. For example, if the ratio of fluid dielectrics in a flowing fluid mixture is desired to be known, or if one or more of the flow rates or quantities of the fluids in the mixture is desired, but the actual variation of the ratio of fluids is relatively small with respect to the possible variation (as where one fluid of the mixture actually varies only from 0–10 percent of the total volume of the mixture, but where possible variance could be 0–100 percent), it has not been possible with the pulse-analog comparison and gating system of U.S. Pat. No. 3,385,108 to obtain accurate measurements. Or, for example, where corrections in volume are necessary to compensate for the effect of temperature and/or pressure variations in a flowing fluid stream where actual variations in volume are small with respect to possible variation, the inherent error in the prior art system renders the corrections unreliable.

In the prior art system of U.S. Pat. No. 3,385,108, if water content of the flowing mixture varies over any small portion of the total possible range (as 0–4%, 0–10%, 20–25%, and so forth) to which the system can respond (0–100%), only a small segment of the total ramp length of the sawtooth is utilized in the comparison with the analog. This repeated continual comparison of the probe analog to only 10 percent or less of the ramp length introduces an inherent error in the prior art system which is unacceptable when the constituents must be determined with accuracy over only the said small portion of the total possible range.

The present invention solves this problem, its concept being embodied in a system which employs an important part of the excellent concept in U.S. Pat. No. 3,385,108, and yet permits use of the entire ramp length of the sawtooth pulse for operating the gating switch even though the correction required by a change in the condition affecting flow measurement is only over a small part of the total possible range of such condition.

Stated generally, the invention solves the problem of correcting volume and flow rate measurements when the change in a physical characteristic of a flowing mass which affects volume or rate requires such correction, and when the actual variations of the physical characteristic in the given system occurs over only a small portion of the theoretically possible variation of the physical characteristic.

SUMMARY OF THE INVENTION

Accordingly, the principal object of the invention is to provide an improved system for the quantification of volumes or flow rates of a flowing mass. The attainment of this object includes sensing a change of a physical property affecting flow volume or rate over only a small preselected portion of the possible range over which the change can occur, and converting the signals proportional to the changes of the property within such preselected range to full (or expanded) range equivalents to affect volume or flow rate corrections due to such small changes.

The invention contemplates a system to correct flow rate or volume measurements to a selected reference or base condition by correcting for the effect of a physical condition in a given low order range of change of the condition, and including a first transducer responsive to the flow of the fluid mixture and producing voltage pulses of a frequency proportional thereto, and a second transducer responsive to a physical condition of the flowing mass, such as dielectric constant. The second transducer, as an element of a circuit also comprised of one of the several well-known detector elements, produces in known fashion an analog voltage of an amplitude proportional to such condition. The analog voltage is compared to a fixed-time-base voltage signal whose amplitude is directly proportional in time, and the voltage resultant of this comparison from a comparator circuit gates voltage pulses generated by the first transducer through a switch to a divider circuit. The divider circuit divides the quantity of the pulses of the gated pulse train to produce the equivalent of a pulse train for a full or expanded range measurement. A subtractor circuit then combines the divider output pulses with the total pulse output of the first transducer to compensate for the effect on flow rate or volume of the change of the physical condition in question, and a suitable volume counter or flow rate indicator then registers the flow rate or volume of the flowing mass corrected for the change in the physical condition.

Other objects, advantages, and features of this invention will become apparent to one skilled in the art upon consideration of the written specification, appended claims, and attached drawing, wherein;

the FIGURE is a diagrammatic representation of the elements of a system embodying the invention for manifesting the amounts of selected liquids of a mixture.

DESCRIPTION OF THE PREFERRED EMBODIMENT

1. Plan of the Description

The FIGURE depicts a system for correcting measurement of oil volume or flow rate in a flowing oil and water stream where the ratio of water to oil is low. Certain basic elements for effecting these measurements are disclosed in U.S. Pat. No. 3,385,108. Material therein which is essential to the disclosure of the present invention is hereby incorporated by reference.

It is stressed that the present invention is not limited merely to accurate measure of the constituents of low water-oil ratio streams in which small variations of water content occur. Any combination of flowing fluids and physical properties thereof which properly actuate the two transducer elements can be measured by the invention.

However, though change in volume of some selected fluid, such as gas, due to a change in the ratio of fluids of a flowing fluid mixture comprised of many fluids other than oil and water may be compensated by the invention, the common case of water-oil mixture will be referred to for simplicity and clarity of the disclosure. In addition, when further reference to flow rate and/or flow volume is required, a reference to flow volume will be understood to include by implication reference to flow rate. The terms are of equal consequence in the embodiment, and either may be manifest with equal facility by mere selection of a volume counter or a flow rate counter as manifesting means.

2. The Description

The FIGURE discloses the embodiment of the invention in a system for the measurement of oil and/or water volume present in a flowing mixture thereof, where the water to oil ratio is low, i.e., 0–10 percent. The system for accomplishing oil-water measurements in the usual case is disclosed in U.S. Pat. No. 3,385,108. Certain portions of that system are present in the embodiment, and material in U.S. Pat. No. 3,385,108 essential to this disclosure is incorporated by reference.

Referring to the FIGURE, a water-oil stream flows through conduit 1. Oil volume is the measurement of main importance, and is manifested on counter 2. If desired, water volume and total fluid may be conveniently provided as shown, on counter 3 and counter 28.

Meter 4 in conduit 1 generates voltage pulses at a frequency proportional to flow rate of the fluid mixture. Networks 5, 6 amplify and square the pulses, and the output of element 6 remains proportional to flow. These pulses, initially generated by the meter 4, are to be gated through an electrical switch in dependence upon the level of the analog signal from the capacitor circuitry.

A capacitor 10 in contact with the fluids in conduit 1 is a transducer responsive to the dielectric constant of the fluid mixture. Capacitor 10 is mounted so the mixture of fluids passes between its plates. Thus, the dielectric constant of the mixture is continuously and instantaneously measured in conjunction with the flow measurement by meter 4. When the composition of the mixture changes, the value of the dielectric constant changes, and thus the capacitance of the capacitor, commonly referred to as a "probe," changes. In the oil-water mixture, for example, capacitance of probe 10 increases as percent water increases.

Probe 10 and detector 11 comprise the circuit in which a voltage output analogous to the fluids mixture is developed. The voltage analog of the probe-detector circuit is translated by converter 13 to a DC voltage of an amplitude compatible with the subsequent elements of the system. This analog DC voltage is applied as will be explained to control the diversion of the voltage pulses of meter 4 through the switch to the counter 2.

A converter network 15 receives two inputs: (1) the square wave pulses of the meter and associated circuits 5,6; and (2) the analog DC from the probe-detector circuit and associated converter 13.

The analog to digital converter 15 consists of an electrical signal generator, a comparator circuit, and an electronic switch. The generator produces a periodic fixed-time-base voltage with amplitude directly proportional to time (a form commonly referred to as a linear sawtooth voltage). The DC voltage from probe 10 is compared to the sawtooth voltage during the time duration of the time base of the sawtooth. Dependent upon this comparison, i.e., upon the time at which the sawtooth and probe voltages are equal, a comparator output is generated to close the electric switch. When the switch is closed, the pulses of meter 4 are applied at divider 25 for the remainder of the time duration of the fixed-time base of the sawtooth period. When the switch is open, the pulses are not transmitted beyond converter 15.

In operation, the probe voltage is applied at the comparator; when the sawtooth voltage increases to equal that of the probe, the comparator voltage closes the switch; when the switch is closed, the pulses of the meter 4 are applied (gated) to a divider connected to the switch. These pulses are so applied for the remainder of the time of the sawtooth period during which the comparison is made. The process is then repeated during the following sawtooth pulse of the generator.

The number of meter pulses diverted to the divider 25 is dependent only upon the probe analog. For a water content of 25 percent of any given full scale setting of the system, the analog due to the probe will equal the sawtooth voltage when the sawtooth is 75 percent of its maximum. Thus, 25 percent of the meter pulses generated over the entire time base of the fixed-time-base generator are applied at divider 25, since the switch is only biased closed over 25 percent of the sawtooth time base by the comparator output.

The divider circuit 25 receives the pulse output of converter network 15. The voltage pulses from converter 15 proportional to the water content of the water-oil mixture are reproduced in a fixed preselected percent as an output of the divider 25, the percent depending upon the dividing factor set into the divider.

For example, it is known that water content in a given oil-water stream will never exceed 4 percent of total volume. Therefore, since it is required that the system detect a water content of the mixture only between a minimum of 0 percent and a maximum of 4 percent, a dividing factor of 25 is set into the divider (1/25 being the fractional equal of 0.04; or, any number, $N/25=4\%\times N$). The "full range of change" is spoken of in this example as 0–4%; total possible range of the water fraction would be 0–100%. When water content is 25% of the given range of 4%, (or 1% of total fluid), 25% of the given range of 4%, (or 1% of total fluid), 25% of the total pulses of one sawtooth period are gated by the converter network 15 in response to the analog signal of the probe element. If the flow rate detected by flow meter 4 produces, for instance, 200 pulses over the time base of one period of the sawtooth generator of converter 15, 50 pulses are thus gated to divider 25. The output of the divider, when the selected dividing factor of 25 is set in, is thus 2 pulses. These pulses, as seen in the FIGURE, may be registered at a counter 3 to record water volume. The total output of 200 pulses during the sawtooth period can be registered, if desired, at counter 28 to record the total flow.

As stated, a counting of the water volume and total volume is carried out at counters 3,28. It is clear that an observer may subtract to deduce the oil volume of the stream. However, such a method is disadvantageous for apparent reasons, such as possibility of computation error, inconvenience, and lack of utility, since the oil volume measurement is commonly the measure of interest. It is therefore desired to manifest oil volume directly.

The subtractor circuit 26 may be of any well-known form, such as a NAND gate, at which divider 25 output and total meter 4 output are applied. The subtractor cancels a number of the total meter 4 pulses equal to the number of pluses of the divider output. The subtractor output is thus the difference between meter 4 pulses and divider 25 pulses, and is proportional to the oil volume. In the example, the two divider pulses are cancelled from the 200 meter 4 pulses, and the 198 pulses are registered at counter 2 as oil volume.

The result of the invention in the preferred embodiment, therefore, is means to register oil volume, although the 1% water content (25% of 4% range), the 99% oil content (198 of the 200 meter pulses), and the total volume (200 pulses) are all shown being registered by the system depicted in the FIGURE. Other embodiments might exhibit various other combinations of the counters 2,3,28 within the scope of the invention. As stated, since it will be common practice to measure and count oil volume only, counters 3,28 will be superfluous in most actual reductions.

It is further noted that the outputs from divider 25 or subtractor 26 could control other means, such as computer circuits designed to receive and utilize information of flow conditions in conduit 1. The counters disclosed are only one example of means with which to manifest the measurement.

Detailed disclosure of the operation and circuitry of certain elements may be had by reference to 3,385,108. For ease of reference, numbering of similar structural elements in the subject application is consistent therewith. Reference is also directed to U.S. Pat. No. 3,385,108 for disclosure of certain circuit diagrams, for other further elaboration of the disclosure of certain matters pertaining to the FIGURE, or as otherwise required for understanding of the specification as it relates to incorporations of 3,385,108.

3, Summary.

The concept of the invention is to measure a physical condition, such as dielectric constant, of a flowing fluid mass over a range of change which is only a small preselected, or given, portion of the total possible range change of the physical condition, and to convert electronically the measurements made over this small portion of the possible range to an equivalent of the possible range. In the example, the full range to be expected was 0–4 percent, and a 25 percent change in this given or preselected portion was translated to a 1 percent change in the total range of 0—100 percent by the embodiment of the inventive concept.

The concept functions to solve the problem of error introduced in measuring of such small changes, and overcomes the problems of inherent error introduced in such circumstances into prior art systems.

From the foregoing, it will be seen that this invention is one well adapted to attain all of the ends and objects hereinabove set forth, together with other advantages which are obvious and inherent to the method and apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth are shown in the accompanying drawing is to be interpreted in an illustrative and not in a limiting sense.

The invention, having been described, what is claimed is:

1. A system which manifests the quantity of one fluid of a flowing mixture fluids, including,
   a first transducer producing a pulsed electrical signal at a pulse frequency proportional to the flow rate of the fluid mixture,
   a second transducer producing an instantaneous analog electrical signal proportional to the amount of a selected first one of the fluids which comprise the flowing fluid mixture,
   an electrical signal generator producing a linear sawtooth voltage over a selected time interval,
   a comparator circuit, responsive to the linear sawtooth voltage, which compares the second transducer and sawtooth voltages and produces a voltage to operate an electrical switch means in a selected position for a portion of the time interval of the sawtooth voltage,
   an electrical switching means connected to the comparator circuit and first transducer, and operative in response to the voltage output of the comparator circuit for switching the output pulses of the first transducer,
   a divider means connected to the switch for reproducing only a preselected percent of the first transduce pulses gated by the switch means, the percent being dependent upon the full range value of a selected one of the fluids of the mixture,
   a subtractive circuit means connected to the divider and responsive to the pulsed output of the divider and the total pulse output of the first transducer for subtracting the output pulses of the divider from the output pulses of the first transducer, and
   a counter means connected to the subtractive circuit for counting the pulse output thereof to indicate the quantity of the fluid mixture less the quantity of the selected first one of the fluids passing across the first transducer.

2. A system which manifests the quantity of one fluid of a flowing mixture of fluids, including,
   a first transducer producing a pulsed electrical signal at a pulse frequency proportional to the flow rate of the fluid mixture,
   a second transducer producing an instantaneous analog electrical signal proportional to the amount of a selected first one of the fluids which comprise the flowing fluid mixture,
   a first counter means connected to the first transducer for counting the pulse output thereof to indicate the quantity of the fluid mixture which passes across the first transducer,
   an electrical signal generator producing a linear sawtooth voltage over a selected time interval,
   a comparator circuit responsive to the signal output voltage of the second transducer and responsive to the linear sawtooth voltage which compares the second transducer and sawtooth voltages and produces a voltage to operate an electrical switch means in a selected position for a portion of the time interval of the sawtooth voltage,
   an electrical switching means connected to the comparator circuit and first transducer, and operative in response to the voltage output of the comparator circuit for switching the output pulses of the first transducer,
   a divider means connected to the switch for reproducing only a preselected percent of the first transducer pulses gated by the switch means, the percent being dependent upon the full range value of a selected one of the fluids of the mixture, and
   a second counter means connected to the divider for counting the pulse output of the divider to indicate the quantity of the selected first one of the fluids which passes across the first transducer,
   whereby the amount of the selected first fluid of the mixture is known and the total amount of the fluids of the mixture is known.

3. A net oil computer system which manifests the quantity of oil in a flowing mixture comprised primarily of oil and water, an in which mixture the ration of oil to water is of an order of 10 to 100, including
   a flow meter producing a pulsed electrical signal at a pulse frequency proportional to the flow rate of the fluid mixture,
   a capacitance probe and detector-converter circuit producing an instantaneous analog electrical signal proportional to the amount of water in the flowing fluid mixture,
   a voltage generator producing a linear sawtooth voltage signal within a selected time period,
   a comparator circuit responsive to the signal from the capacitance probe and the linear sawtooth voltage, and which compares the analog signal of the probe with the sawtooth voltage and produces a voltage to operate an electrical switch for a portion of the time interval of the sawtooth voltage,
   an electrical switch connected to the comparator circuit and flow meter, and operative in response to the voltage output of the comparator circuit for switching the output pulses of the flowmeter,
   a divider means connected to the switch for reproducing a preselected percent of the flowmeter pulses gated by the switch, such percent being dependent upon the anticipated maximum quantity of water in the oil and water mixture,
   a subtractive circuit connected to the divider for subtracting the output pulses of the divider from the output pulses of the flowmeter, and
   a counter connected to the subtractive circuit for manifesting the pulse output thereof to indicate the quantity of oil in the mixture passing through the flowmeter.

4. The net oil computer system of claim 3, including,
   a counter connected to the flowmeter for manifesting the pulse output thereof to indicate the quantity of the mixture passing through the flowmeter, and
   a counter connected to the divider means for manifesting the pulse output thereof to indicate the quantity of water in the mixture passing through the flowmeter.

UNITED STATES PATENT OFFICE
CERTIFICATE OF CORRECTION

Patent No. 3,643,507          Dated February 22, 1972

Inventor(s) Sheyrl W. Garrett

It is certified that error appears in the above-identified patent and that said Letters Patent are hereby corrected as shown below:

Column 5, line 51, before "linear", insert -- signal output voltage of the second transducer and responsive to the --.

Signed and sealed this 19th day of December 1972.

(SEAL)
Attest:

EDWARD M. FLETCHER, JR.              ROBERT GOTTSCHALK
Attesting Officer                    Commissioner of Patents